(12) United States Patent
Sumiya et al.

(10) Patent No.: US 11,984,733 B2
(45) Date of Patent: May 14, 2024

(54) POWER FEEDING SYSTEM DURING TRAVELLING

(71) Applicant: DENSO CORPORATION, Kariya (JP)

(72) Inventors: Hayato Sumiya, Kariya (JP); Eisuke Takahashi, Kariya (JP); Nobuhisa Yamaguchi, Kariya (JP); Masaya Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 183 days.

(21) Appl. No.: 17/580,380

(22) Filed: Jan. 20, 2022

(65) Prior Publication Data

US 2022/0149663 A1 May 12, 2022

Related U.S. Application Data

(63) Continuation of application No. PCT/JP2020/027803, filed on Jul. 17, 2020.

(30) Foreign Application Priority Data

Jul. 26, 2019 (JP) ................................. 2019-137401

(51) Int. Cl.
*H02J 50/12* (2016.01)
*B60L 50/53* (2019.01)
(Continued)

(52) U.S. Cl.
CPC .............. *H02J 50/12* (2016.02); *B60L 50/53* (2019.02); *H02J 50/50* (2016.02); *H04B 5/0037* (2013.01); *H04B 5/0081* (2013.01)

(58) Field of Classification Search
CPC ........ H04B 5/0081; B60L 50/53; H02J 50/50; H02J 50/12
See application file for complete search history.

(56) References Cited

U.S. PATENT DOCUMENTS

| RE19,633 E * | 7/1935 | Baughman | B61L 3/221 246/63 C |
| 8,008,888 B2 * | 8/2011 | Oyobe | H02J 50/12 320/108 |

(Continued)

FOREIGN PATENT DOCUMENTS

| CN | 110549799 A * | 12/2019 | ......... B60C 23/0416 |
| JP | 2009-184521 A | 8/2009 | |

(Continued)

OTHER PUBLICATIONS

Sep. 24, 2020 International Search Report issued in International Patent Application No. PCT/JP2020/026557.

(Continued)

*Primary Examiner* — Menatoallah Youssef
*Assistant Examiner* — Khareem E Almo
(74) *Attorney, Agent, or Firm* — Oliff PLC

(57) ABSTRACT

In a dynamic wireless power transfer system, a power transmission coil is provided in a road. A power transmission circuit supplies electric power to the power transmission coil. A power reception coil is provided in a vehicle. A power reception circuit is connected to the power reception coil. A relay circuit is provided in a tire of the vehicle. The relay circuit includes at least two relay coils that are connected in series. The relay circuit transfers electric power from the power transmission coil to the power reception coil by one relay coil of the two relay coils opposing the power transmission coil and the other relay coil opposing the power reception coil. A resonance frequency of the relay circuit is a frequency that is within a fixed range that is centered on an applied frequency of an alternating-current voltage that is applied to the power transmission coil.

20 Claims, 16 Drawing Sheets

(51) Int. Cl.
*H02J 50/50* (2016.01)
*H04B 5/00* (2006.01)

(56) References Cited

U.S. PATENT DOCUMENTS

| | | | | |
|---|---|---|---|---|
| 9,531,217 | B2* | 12/2016 | Horiuchi | B60L 53/126 |
| 10,410,789 | B2* | 9/2019 | Kurs | H02J 50/70 |
| 11,641,053 | B2* | 5/2023 | Fenkanyn | B60C 23/0444 |
| | | | | 340/447 |
| 2004/0046646 | A1* | 3/2004 | Eskridge | G08G 1/127 |
| | | | | 235/487 |
| 2008/0084285 | A1* | 4/2008 | Bhogal | B60C 11/24 |
| | | | | 340/505 |
| 2010/0225271 | A1 | 9/2010 | Oyobe et al. | |
| 2011/0031047 | A1 | 2/2011 | Tarr | |
| 2011/0121778 | A1 | 5/2011 | Oyobe et al. | |
| 2011/0298422 | A1 | 12/2011 | Failing | |
| 2012/0032525 | A1 | 2/2012 | Oyobe et al. | |
| 2012/0116694 | A1* | 5/2012 | Norair | B60C 23/064 |
| | | | | 702/50 |
| 2015/0210170 | A1 | 7/2015 | Oyobe et al. | |
| 2015/0251546 | A1 | 9/2015 | Oyobe et al. | |
| 2016/0023557 | A1 | 1/2016 | Dimke et al. | |
| 2017/0373541 | A1* | 12/2017 | Shimokawa | H02M 7/06 |
| 2020/0130437 | A1* | 4/2020 | Root | G07C 5/0808 |
| 2022/0063415 | A1* | 3/2022 | Wakao | B60C 9/08 |
| 2022/0288974 | A1* | 9/2022 | Kuwayama | B60C 1/0016 |

FOREIGN PATENT DOCUMENTS

| | | |
|---|---|---|
| JP | 2011-130614 A | 6/2011 |
| JP | 2012-157231 A | 8/2012 |
| JP | 2013-051744 A | 3/2013 |
| JP | 2016-220353 A | 12/2016 |
| JP | 2016-226072 A | 12/2016 |
| JP | 2017-093113 A | 5/2017 |
| JP | 2021-023002 A | 2/2021 |
| JP | 2021-023003 A | 2/2021 |
| KR | 10-1217655 B1 | 1/2013 |

OTHER PUBLICATIONS

Sep. 29, 2020 International Search Report issued in International Patent Application No. PCT/JP2020/027803.

U.S. Appl. No. 17/585,195, filed Jan. 26, 2022 in the name of Hayato Sumiya et al.

* cited by examiner

US 11,984,733 B2

POWER FEEDING SYSTEM DURING TRAVELLING

CROSS-REFERENCE TO RELATED APPLICATIONS

The present application is a continuation application of International Application No. PCT/JP2020/027803, filed on Jul. 17, 2020, which claims priority to Japanese Patent Application No. 2019-137401, filed on Jul. 26, 2019. The contents of these applications are incorporated herein by reference in their entirety.

BACKGROUND

Technical Field

The present disclosure relates to a dynamic wireless power transfer system that supplies electric power to a moving body that is traveling.

Related Art

A dynamic wireless power transfer system is known. In the dynamic wireless power transfer system, electric power is transferred from a power transmission coil that is embedded on a ground side to a power reception coil that is mounted under a floor of a vehicle.

SUMMARY

One aspect of the present disclosure provides a dynamic wireless power transfer system. The dynamic wireless power transfer system includes a power transmission coil, a power transmission circuit, a power reception coil, a power reception circuit, and a relay circuit. The power transmission coil is provided in a road. The power transmission circuit supplies electric power to the power transmission coil. The power reception coil is provided in a vehicle. The power reception circuit is connected to the power reception coil. The relay circuit is provided in a tire of the vehicle. The relay circuit includes at least two relay coils that are connected in series. The relay circuit transfers electric power from the power transmission coil to the power reception coil by one relay coil of the two relay coils opposing the power transmission coil and the other relay coil opposing the power reception coil. A resonance frequency of the relay circuit is a frequency that is within a fixed range that is centered on an applied frequency of an alternating-current voltage that is applied to the power transmission coil.

DESCRIPTION OF THE EMBODIMENTS

Embodiments of the present disclosure relate to a dynamic wireless power transfer system that supplies electric power to a moving body such as a vehicle that is traveling.

JP-A-2016-220353 discloses a dynamic wireless power transfer system. In the dynamic wireless power transfer system, electric power is transferred from a power transmission coil that is embedded on a ground side to a power reception coil that is mounted under a floor of a vehicle.

In a method in JP-A-2016-220353, because there is a large distance between the power transmission coil and the power reception coil, increasing power transmission efficiency is difficult. In addition, there is also an issue in that the distance between the power transmission coil and the power reception coil changes depending on the vehicle.

An exemplary embodiment of the present disclosure provides a dynamic wireless power transfer system. The dynamic wireless power transfer system includes: a power transmission coil that is provided in a road; a power transmission circuit that supplies electric power to the power transmission coil; a power reception coil that is provided in a vehicle; a power reception circuit that is connected to the power reception coil; and a relay circuit that is provided in a tire of the vehicle, includes at least two relay coils that are connected in series, and transfers electric power from the power transmission coil to the power reception coil by one relay coil of the two relay coils opposing the power transmission coil and the other relay coil opposing the power reception coil. A resonance frequency of the relay circuit is a frequency that is within a fixed range that is centered on an applied frequency of an alternating-current voltage that is applied to the power transmission coil.

As a result of this exemplary embodiment, because electric power is transferred from the power transmission coil to the power reception coil through the relay coil, a distance between the power transmission coil and the power reception coil need not be considered. An issue in that the distance between the power transmission coil and the power reception coil changes depending on the vehicle also need not be considered. The resonance frequencies of the power transmission coil, the power reception coil, and the relay coil are frequencies within a fixed range that is centered on a frequency that is prescribed in advance. Therefore, transfer efficiency from the power transmission coil to the power reception coil can be improved.

First Embodiment

Figure 1:
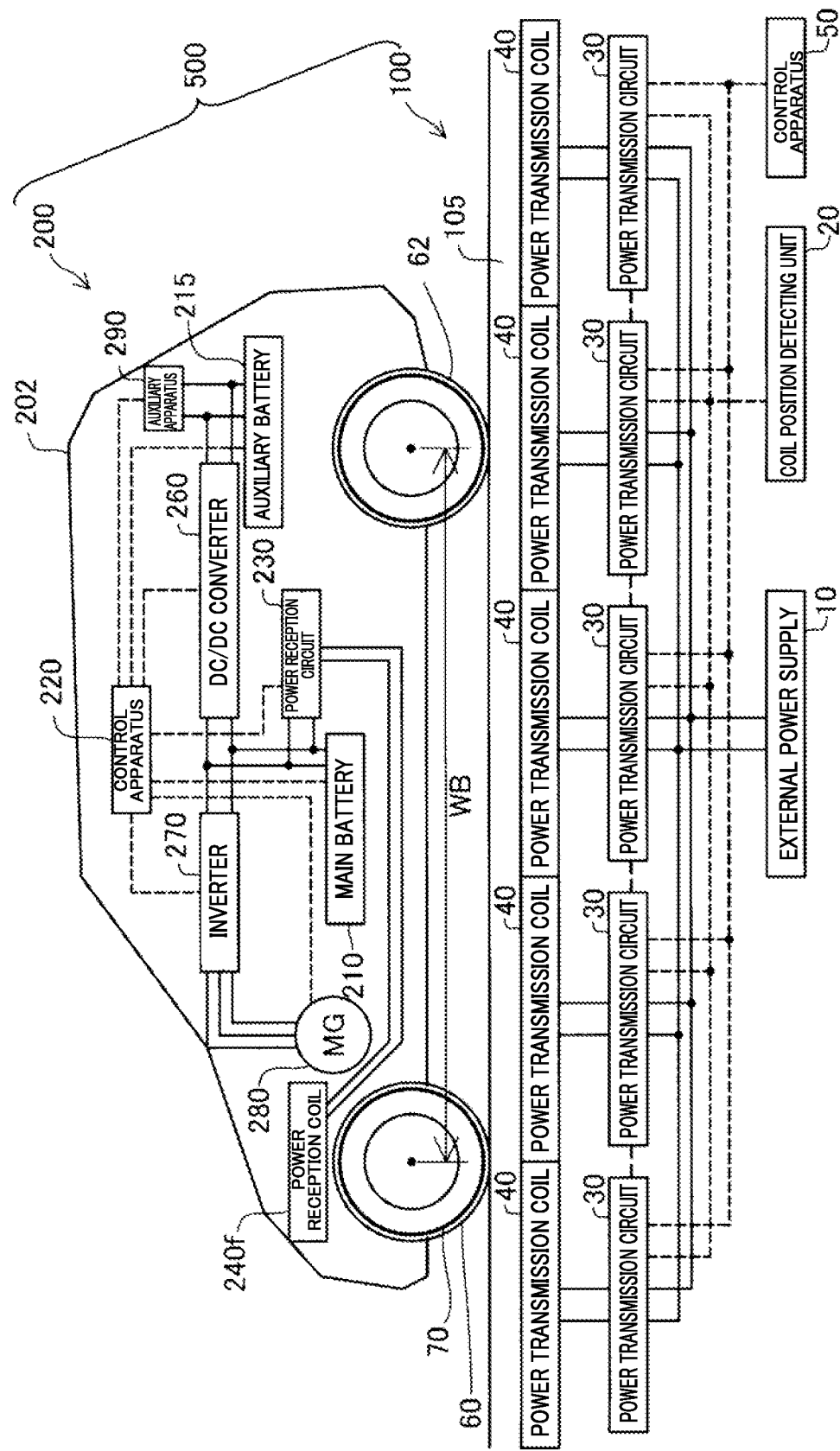
FIG. 1 is a block diagram of a dynamic wireless power transfer system.

As shown in FIG. 1, a dynamic wireless power transfer system 500 according to a first embodiment includes a power transmission system 100 that is provided in a road 105 and a power reception system 200 on a vehicle 202 side. The dynamic wireless power transfer system 500 is a system that is capable of supplying electric power from the power transmission system 100 to the vehicle 202 while the vehicle 202 is traveling. For example, the vehicle 202 may be configured as an electric vehicle or a hybrid vehicle.

The power transmission system 100 on the road 105 side includes a plurality of power transmission coils 40, a plurality of power transmission circuits 30 that apply an alternating-current voltage to each of the plurality of power transmission coils 40 and supply electric power, an external power supply 10 (shortened hereafter to a "power supply 10") that supplies electric power to the plurality of power transmission circuits 30, a coil position detecting unit 20, and a control apparatus 50.

The plurality of power transmission coils 40 are set along an advancing direction of the road 105. The power transmission circuit 30 is a circuit that converts a direct-current voltage that is supplied from the power supply 10 to a high-frequency alternating-current voltage, and applies the alternating-current voltage to the power transmission coil 40. The power transmission circuit 30 includes an inverter circuit, a filter circuit, and a resonance circuit.

According to the present embodiment, the inverter circuit, the filter circuit, and the resonance circuit are known. Therefore, descriptions thereof are omitted. The power supply 10 is a circuit that supplies electric power to the power transmission circuit 30. For example, the power supply 10 may supply electric power to the power transmission circuit 30 from a system power supply through a power factor correction circuit (PFC). Illustration of the PFC is omitted. The direct-current voltage that is outputted from the power supply 10 may not be a full direct-current voltage and may include variations (ripples) to a certain extent.

The coil position detecting unit 20 detects a relative position of a relay circuit 70 that is mounted in a front wheel tire 60 of the vehicle 202 to the power transmission coil 40. For example, the coil position detecting unit 20 may detect the position of the relay circuit 70 based on a magnitude of transmitted power or transmitted current in the plurality of power transmission circuits 30. Alternatively, the coil position detecting unit 20 may detect the position of the relay circuit 70 using wireless communication with the vehicle 202 or a position sensor that detects a position of the vehicle 202. The control apparatus 50 makes one or more power transmission circuits 30 and power transmission coils 40 that are close to the relay circuit 70 perform power transmission based on the position of the relay circuit 70 that is detected by the coil position detecting unit 20.

The vehicle 202 includes a main battery 210, an auxiliary battery 215, a control apparatus 220, a power reception circuit 230, a power reception coil 240f, a direct-current/direct-current (DC/DC) converter circuit 260, an inverter circuit 270, a motor generator 280, an auxiliary apparatus 290, the front wheel tire 60, and a rear wheel tire 62. The power reception coil 240f is connected to the power reception circuit 230. The main battery 210, a high voltage side of the DC/DC converter circuit 260, and the inverter circuit 270 are connected to an output of the power reception circuit 230. The auxiliary battery 215 and the auxiliary apparatus 290 are connected on a low voltage side of the DC/DC converter circuit 260. The motor generator 280 is connected to the inverter circuit 270.

The tire 60 includes the relay circuit 70. The relay circuit 70 has a relay coil. The relay coil is embedded along a tread surface of the front wheel tire 60. The relay coil will be described hereafter. The relay coil generates inductive electromotive force by electromagnetic induction between the relay coil and the power transmission coil 40. The power reception coil 240f is arranged vertically above the front wheel tire 60. The power reception coil 240f generates inductive electromotive force by electromagnetic induction between the relay coil and the power reception coil 240. That is, the relay circuit 70 relays power supply from the power transmission coil 40 to the power reception coil 240f.

The power reception circuit 230 includes a rectification circuit that converts an alternating-current voltage that is outputted from the power reception coil 240f to a direct-current voltage. Here, the power reception circuit 230 may include a DC/DC converter circuit that converts the direct-current voltage that is generated by the rectification circuit to a voltage that is suitable for charging of the main battery 210. The direct-current voltage that is outputted from the power reception circuit 230 can be used for charging of the main battery 210 and driving of the motor generator 280 through the inverter circuit 270. In addition, as a result of the direct-current voltage being stepped down using the DC/DC converter 260, the direct-current voltage can also be used for charging of the auxiliary battery 215 and driving of the auxiliary apparatus 290.

The main battery 210 is a secondary battery that outputs a relatively high direct-current voltage for driving the motor generator 280. The motor generator 280 operates as a three-phase alternating-current motor and generates driving force for traveling of the vehicle 202. The motor generator 280 operates as a generator during deceleration of the vehicle 202 and generates a three-phase alternating-current voltage.

When the motor generator 280 operates as the motor, the inverter circuit 270 converts the direct-current voltage of the main battery 210 to a three-phase alternating-current voltage and supplies the motor generator 280 with the three-phase alternating-current voltage. When the motor generator 280 operates as the generator, the inverter circuit 270 converts the three-phase alternating-current voltage that is outputted from the motor generator 280 to a direct-current voltage and supplies the main battery 210 with the direct-current voltage.

The DC/DC converter circuit 260 converts the direct-current voltage of the main battery 210 to a direct-current voltage that is suitable for driving of the auxiliary apparatus 290 and supplies the auxiliary battery 215 and the auxiliary apparatus 290 with the direct-current voltage. The auxiliary battery 215 is a secondary battery that outputs a direct-current voltage for driving the auxiliary apparatus 290. The auxiliary apparatus 290 includes peripheral apparatuses such as an air-conditioning apparatus, an electric power steering apparatus, headlights, a turn signal, and windshield wipers of the vehicle 202 and various accessories of the vehicle 202. The DC/DC converter circuit 260 may not be provided.

The control apparatus 220 controls each section within the vehicle 202. The control apparatus 220 controls the power reception circuit 230 and performs power reception when a dynamic wireless power transfer is received.

Figure 2:
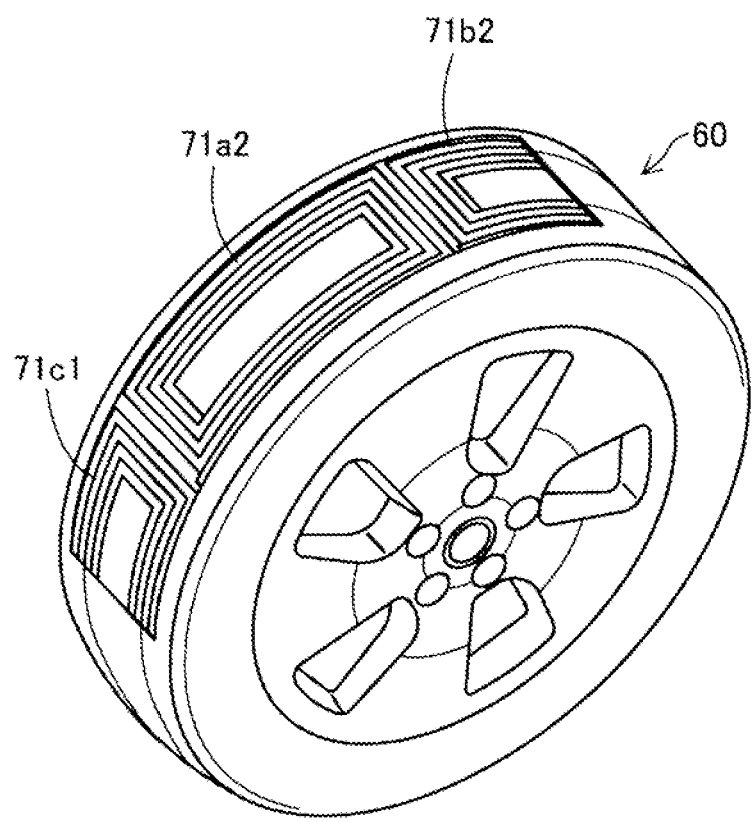
FIG. 2 is a perspective view in which a portion of a front wheel tire is transparent.
Figure 3A:
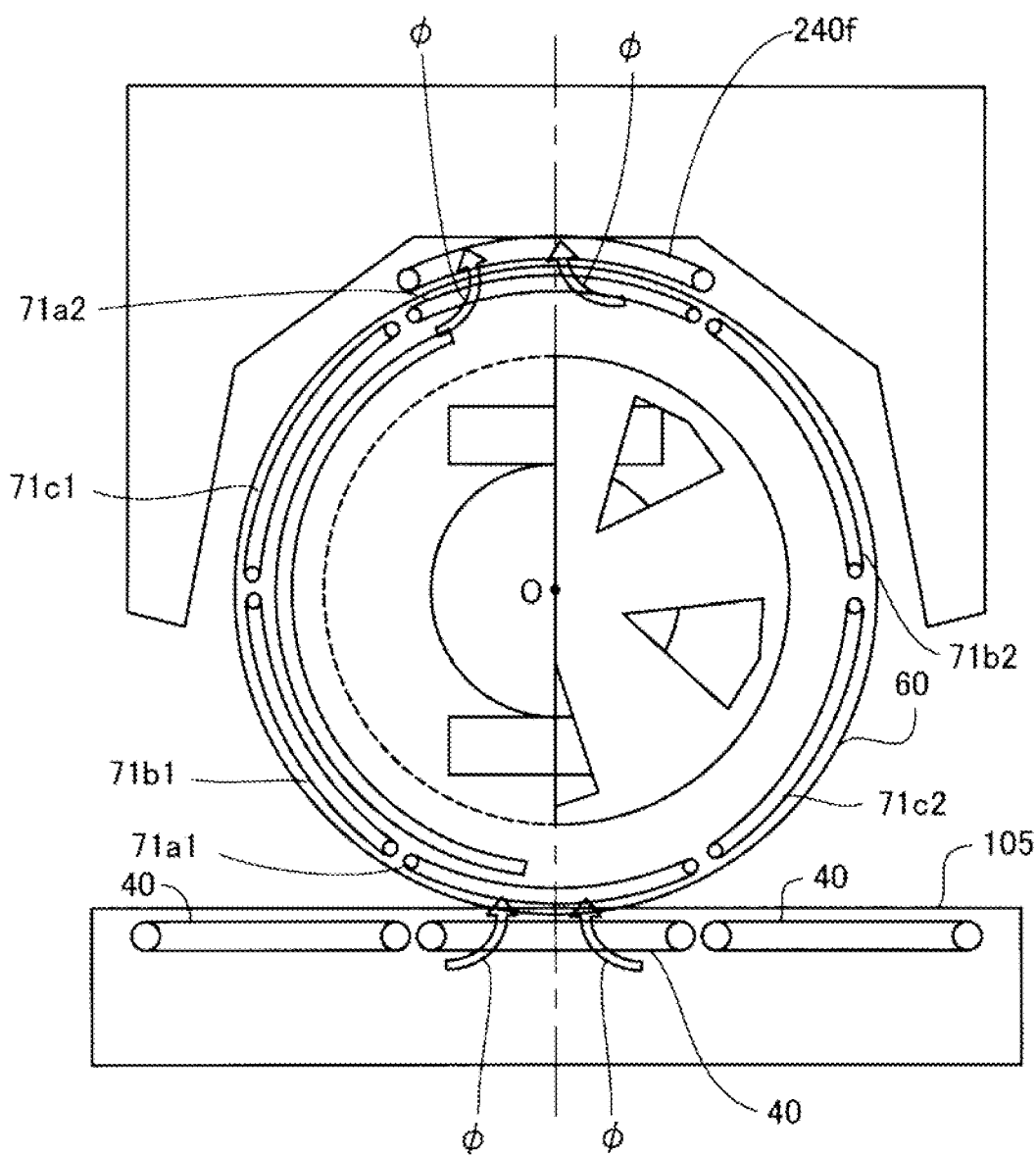
FIG. 3A is a diagram of a cross-section and a partial transparent view of a side surface of the front wheel tire.
Figure 3B:
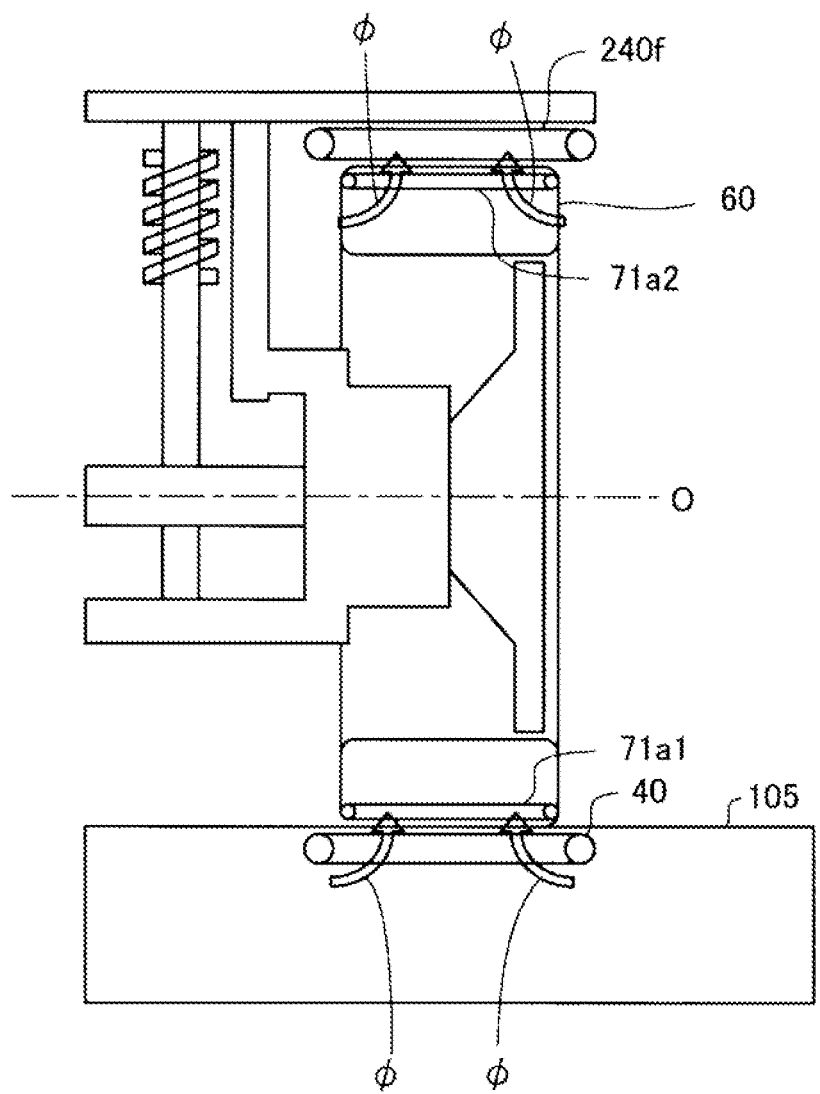
FIG. 3B is a cross-sectional view of the front wheel tire.

As shown in FIG. 2, FIG. 3A, and FIG. 3B, the front wheel tire 60 includes six relay coils 71a1, 71a2, 71b1, 71b2, 71c1, and 71c2 that are arranged along an outer circumferential surface. When differentiation among the six relay coils is not made, the relay coil is referred to as a "relay coil 71." In FIG. 2, the relay coil 71 is formed by four turns. However, the relay coil 71 is wound in an appropriate number of turns based on inductance and resonance frequency described hereafter.

In addition, FIG. 2 shows a transparent view of the overall relay coil 71a2, but shows only portions of the relay coils 71c and 71b2 in the transparent view. Here, to make the drawing easier to view, in FIG. 3 and subsequent drawings, a single turn is shown. The relay coils 71a1 71a2 are in point symmetrical positions in relation to a rotational center O of the front wheel tire 60. The relay coils 71b1 and 71b2 and the relay coils 71c1 and 71c2 are also similarly in point symmetrical positions in relation to the rotation center O of the front wheel tire 60. When one relay coil 71a1 opposes the power transmission coil 40, the other relay coil 71a2 opposes the power reception coil 240f. This similarly applies to the relay coils 71b1 and 71b2 and the relay coils 71c1 and 71c2 as well.

As described hereafter, the relay coils 71a1 and 71a2 are connected in series. When the relay coil 71a1 opposes the power transmission coil 40, the relay coil 71a2 opposes the power reception coil 240f. At this time, a magnetic flux q that is generated in the power transmission coil 40 penetrates the relay coil 71a1. The relay coil 71a1 generates an induced current and electric power is transferred from the power transmission coil 40 to the relay coil 71a1.

When electric power is transferred to the relay coil 71a1, the current also flows to the relay coil 71a2 that is connected in series to the relay coil 71a1, and the magnetic flux q is generated. The magnetic flux q that is generated in the relay coil 71a2 passes through the power reception coil 240f, and electric power is transferred from the relay coil 71a2 to the power reception coil 240f. That is, when the front wheel tire 60 rotates 180° and the relay coil 71a2 opposes the power transmission coil 40, the relay coil 71a that is in a symmetrical position opposes the power reception coil 240f. This similarly applies to the relay coils 71b1 and 71b2 and the relay coils 71c1 and 71c2 as well.

Figure 4:
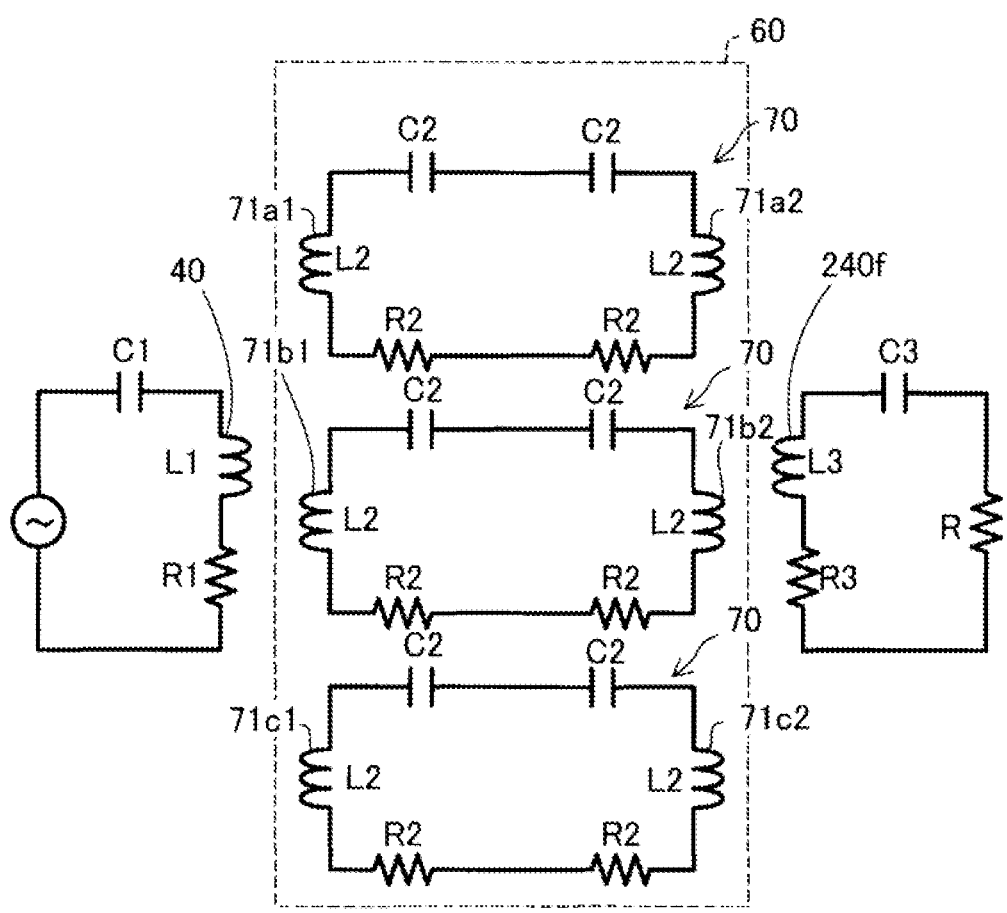
FIG. 4 is an equivalent circuit of a power transmission coil, a relay coil, and a power reception coil.

As shown in FIG. 4, the relay coils 71a1 and 71a2 may configure a single relay circuit 70 by being connected in series with two resonance capacitors C2 therebetween. Here, in FIG. 1 to FIG. 3B, illustration of the capacitors is omitted. The relay coils 71b1 and 71b2 and the relay coils 71c1 and 71c2 similarly respectively configure the relay circuits 70 by being connected in series with two resonance capacitors C2 therebetween. That is, a single front wheel tire 60 includes three relay circuits 70.

Here, a number of relay circuits 70 that are provided in the front wheel tire 60 is not limited to three and is merely required to be one or more. A resonance capacitor C1 is connected in series to the power transmission coil 40, and a resonance capacitor C3 is connected in series to the power reception coil 240f. Regarding the power transmission coil and the power reception coil, the resonance capacitor may be connected in parallel to the coil. A filter or the like may be provided in an earlier stage from the power transmission coil and a later stage from the power reception coil.

When inductance of the power transmission coil 40 is L1, electrical resistance of the power transmission coil 40 and wiring is R1, and inductance of the relay coil 71a1 is L2, impedance Z1 that includes the power transmission coil 40 on the road 105 side is expressed by $$Z1=R1+j(\omega 1 \cdot La - 1/(\omega 1 \cdot C1))$$

$$La=L1+L2\pm 2Ma=L1+L2\pm 2ka(L1 \cdot L2)^{1/2}.$$

Here, $\omega 1$ is an angular frequency, Ma is mutual inductance between the power transmission coil 40 and the relay coil 71a1, and ka is a coupling coefficient of the power transmission coil 40 and the relay coil 71a1. Here, the mutual inductance Ma and the coupling coefficient ka are values that vary based on a rotation angle of the front wheel tire 60. The ± sign before the mutual inductance Ma is "+" when winding directions of the two coils around the penetrating magnetic flux φ are the same, and "−" when the winding directions are opposite. In addition, a relationship $$\omega 1 = 2\overline{\omega} f1$$

is established with a frequency f1 of the voltage that is applied to the power transmission coil 40.

In the above-described expression, the frequency f1 at which Z1 is smallest is $$f1=1/(2\overline{\omega}(La \cdot C1)^{1/2})).$$

When inductance of the power reception coil 240f is L3, electrical resistance of the power reception coil 240f and wiring is R3, and electrical resistance other than that of a resonance circuit is R, impedance Z3 that includes the power reception coil 240f is expressed by $$Z3=R3+R+j(\omega 3 \cdot Lc - 1/(\omega 3 \cdot C3))$$

$$Lc=L2+L3\pm 2Mc=L2+L3\pm 2kc(L2 \cdot L3)^{1/2}.$$

A frequency f3 at which Z3 is smallest is $$f3=1/(2\overline{\omega}(Lc \cdot C3)^{1/2})).$$

When inductance of the relay coils 71a1 and 71a2 is L2, electrical resistance of the relay coils 71a1 and 71a2 and wiring is R2, and inductance of the power reception coil 240 is L3, impedance Z2 that includes the relay coils 71a1 and 71a2 and the two resonance capacitors C2 is expressed by $$Z2=2R2+j(\omega 2 \cdot Lb - 2/(\omega 2 \cdot C2))$$

$$Lb=La+Lc.$$

Here, a frequency f2 at which Z2 is smallest is $$f2=1/(2\overline{\omega}(Lb \cdot C2)^{1/2})).$$

This similarly applies to a circuit that includes the relay coils 71b1 and 71b2, and a circuit that includes the relay coils 71c1 and 71c2.

Here, when the resonance frequencies f1, f2, and f3 are the same as an applied frequency of the voltage that is applied to the power transmission coil 40, electric power can be efficiently transmitted from the power transmission coil to the relay coil 71a1, and electric power can be efficiently transmitted from the relay coil 71a2 to the power reception coil 240f. Here, the frequencies f1, f2, and f3 need not completely match and may be frequencies that are within a fixed range that is centered on a resonance frequency at which inductance Lb of the relay circuit 70 that includes the relay coils 71a1 and 71a2 described hereafter is a local maximum.

Figure 5:
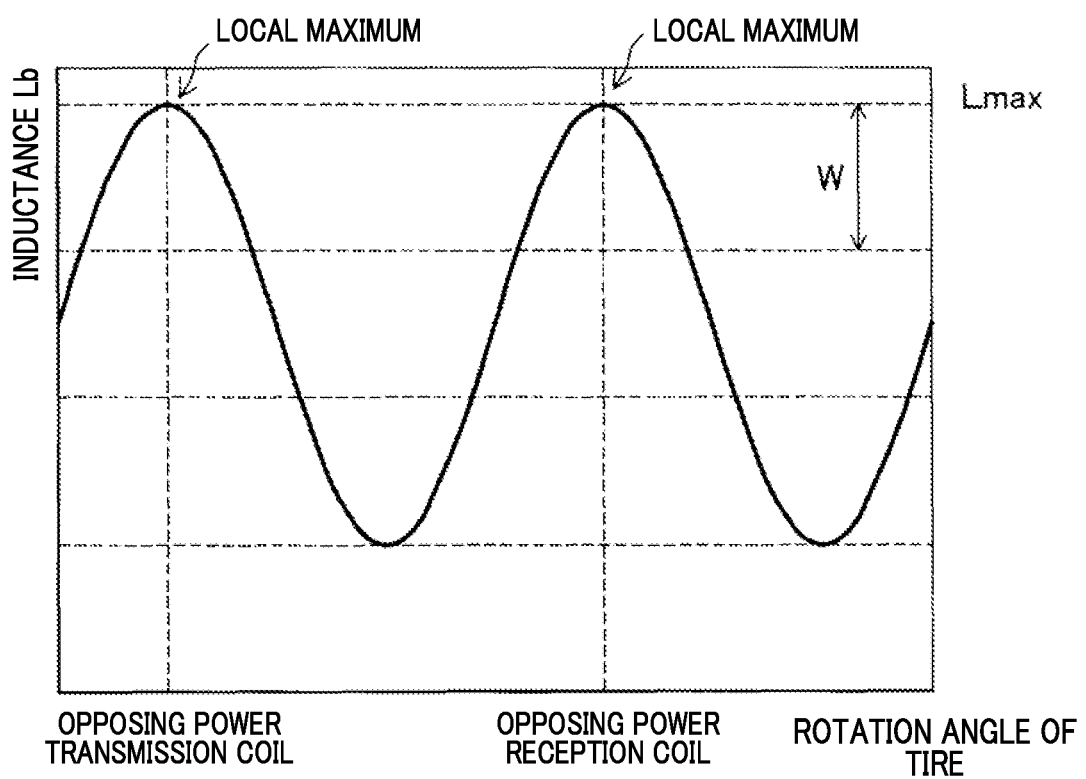
FIG. 5 is a graph illustrating a relationship between a rotation angle of the tire and inductance.

FIG. 5 shows the inductance Lb of the relay circuit 70 that includes the relay coils 71a1 and 71a2. The inductance Lb is a local maximum when the relay circuits 71a1 and 71a2 are in the positions that oppose the power transmission coil 40 and the power reception coil 240f. This is because, as shown in FIG. 2 and FIG. 3, the magnetic flux q that passes through the power transmission coil 40 and the relay coil 71a1 is a local maximum and the magnetic flux q that passes through the relay coil 71a2 and the power reception coil 240f is a local maximum when the relay coil 71a1 is in the position that opposes the power transmission coil 40.

When the front wheel tire 60 rotates and the relay coil 71a1 shifts from the position that opposes the power transmission coil 40 and the relay coil 71a2 shifts from the position that opposes the power reception coil 240f, the inductance Lb decreases. Subsequently, when the front wheel tire 60 rotates to a position in which the relay coil 71a1 opposes the power reception coil 240f and the relay coil 71a2 opposes the power transmission coil 40, the inductance Lb becomes a local maximum. This is because the magnetic flux q that passes through the power transmission coil 40 and the relay coil 71a2 becomes a local maximum, and the magnetic flux q that passes through the relay coil 71a1 and the power reception circuit 240f becomes a local maximum.

Here, a capacitance of the resonance capacitor C2 is set to a local maximum Lmax of the inductance Lb or a capacitance that is within a range from the local maximum Lmax of the inductance Lb to a design value W. As a result, when the front wheel tire 60 rotates, the inductance Lb decreases based on the rotation angle, resonance is broken, and the impedance Z2 increases. Consequently, a current I that flows to the relay coils 71a1 and 71a2 decreases, and loss can be reduced.

The design value W is determined in a following manner. When the number of relay coils 71 that are included in the front wheel tire 60 is N, the design value W is 2Lmax/N. The capacitance of the resonance capacitor C2 is a capacitance that is such that the inductance Lb falls within a range from Lmax to Lmax (1−2/N). In the example shown in FIG. 2 to FIG. 4, the value of N is 6. Therefore, the capacitance of the resonance capacitor C2 is a capacitance that is such that the inductance Lb falls within a range from Lmax to 2Lmax/3.

As a result, while the relay coils 71a1 and 71a2 are transferring electric power, the resonance in the circuit that includes the relay coils 71b1 and 71b2 and the circuit that includes the relay coils 71c1 and 71c2 is broken. Therefore, a current does not easily flow to the relay coils 71b1, 71b2, 71c1, and 71c2. Loss can be reduced and power transfer efficiency can be improved. This similarly applies to when the relay coils 71b1 and 71b2 transfer electric power and when the relay coils 71c1 and 71c2 transfer electric power.

In this manner, if the capacitance of the resonance capacitor C2 is a capacitance that is such that the resonance frequencies of the power transmission coil 40, the power reception coil 240f, and the relay coils 71a1 to 71c2 are frequencies within a fixed range that is centered on a frequency that is prescribed in advance, loss can be reduced and power transfer efficiency can be improved.

Figure 6:
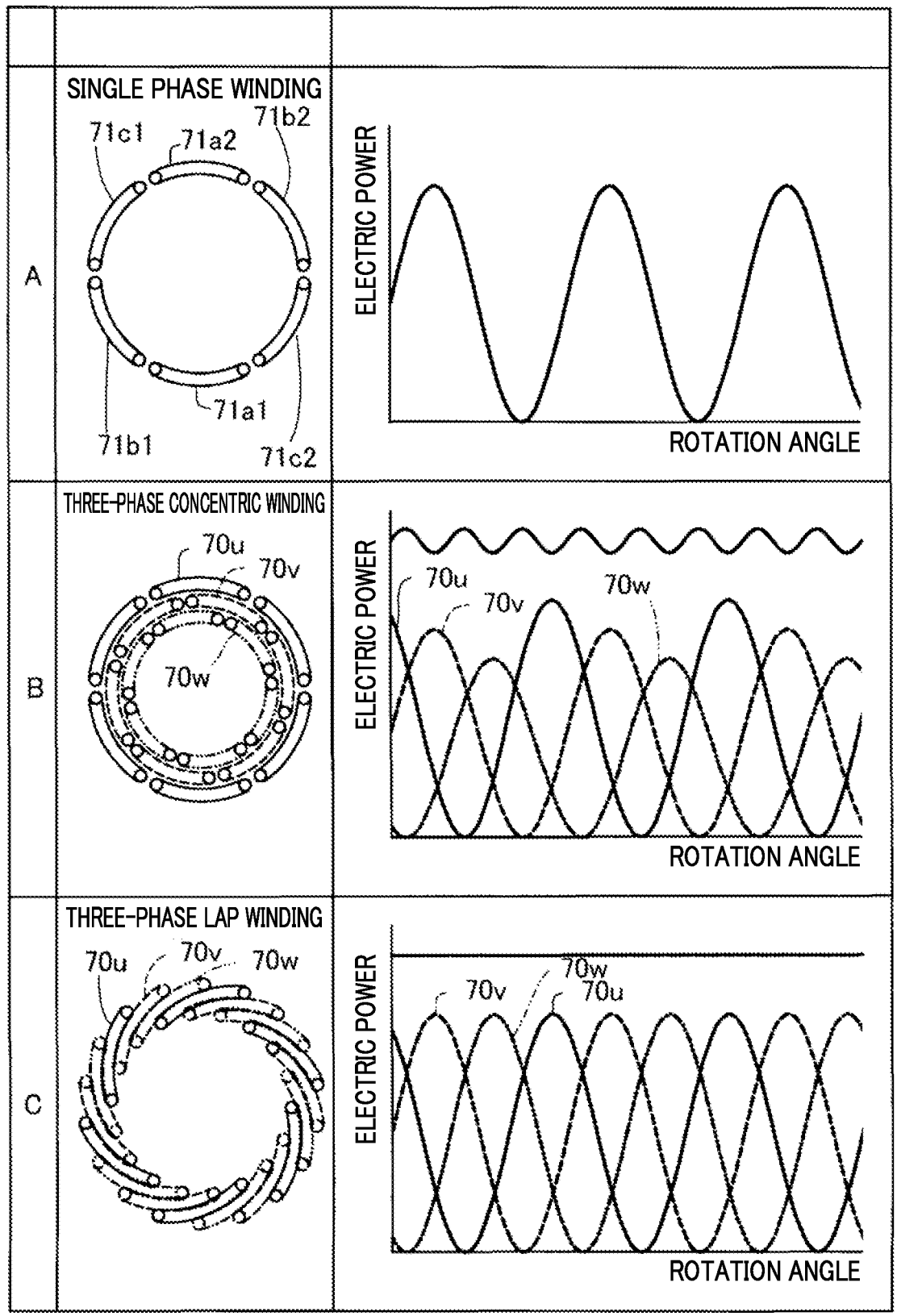
FIG. 6 is an explanatory diagram illustrating a manner of winding of the relay coil and a power transfer amount.

FIG. 6 shows manners of winding of the relay coil. A manner of winding A shows a single phase winding. In the single phase winding, the six relay coils 71a1, 71a2, 71b1, 71b2, 71c1 and 71c2 of the three relay circuits 70 are arranged along the tread surface of the front wheel tire 60.

A manner of winding B shows a three-phase concentric winding. In the three-phase concentric winding, relay circuits 70u, 70v, and 70w of three phases are provided. The relay circuits 70u, 70v, and 70w of the phases each include the three relay circuits 70, that is, the six relay coils 71a1, 71a2, 71b1, 71b2, 71c1 and 71c2 in a manner similar to the single phase winding. In addition, the relay circuits 70u, 70v, and 70w of the three phases are arranged in order from an outer circumference to an inner circumference of the tread surface of the front wheel tire 60.

Furthermore, the relay circuits 70u, 70v, and 70w of the three phases are arranged such that centers are substantially evenly shifted along a circumferential direction such that centers of the respective relay coils 71a1, 71a2, 71b1, 71b2, 71c1 and 71c2 do not overlap, and have differing phases. That is, the relay circuits 70u, 70v, and 70w are configured by the relay coils 71a1, 71a2, 71b1, 71b2, 71c1 and 71c2 that correspond to a U-phase, a V-phase, and a W-phase that are a plurality of phases that have differing phases.

In the three-phase concentric winding, the relay circuit 70v or the relay circuit 70w supplements when power transfer of the relay circuit 70u is small. This similarly applies when power transfer of the other relay circuits 70v and 70w is small. Therefore, overall power transfer can be increased. In addition, the relay circuits 70u, 70v, and 70w of the three phases are arranged in order from the outer circumference to the inner circumference of the tread surface of the front wheel tire 60. Therefore, manufacturing of the front wheel tire 60 including the relay circuits 70u, 70v, and 70w is facilitated.

The manner of winding C shows a three-phase lap winding. In a manner similar to the three-phase concentric winding, the three-phase lap winding also includes the relay circuits 70u, 70v, and 70w of the three phases. The relay circuits 70u, 70v, and 70w each include three relay circuits 70, that is, the six relay coils 71a1, 71a2, 71b1, 71b2, 71c1 and 71c2 in a manner similar to the single phase winding. In the three-phase lap winding as well, the relay circuits 70u, 70v, and 70w are configured by the relay coils 71a1, 71a2, 71b1, 71b2, 71c1 and 71c2 that correspond to the U-phase, the V-phase, and the W-phase that are a plurality of phases that have differing phases.

Whereas the relay circuits 70u, 70v, and 70w of the three phases are arranged in order from the outer circumference to the inner circumference of the tread surface of the front wheel tire 60 in the three-phase concentric winding, the three-phase lap winding differs in that the relay circuits 70u, 70v, and 70w are equivalent and rotationally symmetrical to each other around a rotation axis of the front wheel tire 60. In a manner similar to the three-phase concentric winding, overall power transfer can be increased. In the three-phase lap winding, the relay circuits 70u, 70v, and 70w are equivalent. Therefore, power transfer of the relay circuits 70u, 70v, and 70w is equal and is substantially fixed without pulsating based on a rotation angle of the front wheel tire 60.

In this manner, if he three-phase concentric winding in which the relay coils are configured by a plurality of phases is used, power transfer to the power reception coil 240f can be increased. Furthermore, if the three-phase lap winding is used, pulsation of the received power in the power reception coil 240f can be suppressed.

Second Embodiment

Figure 7:
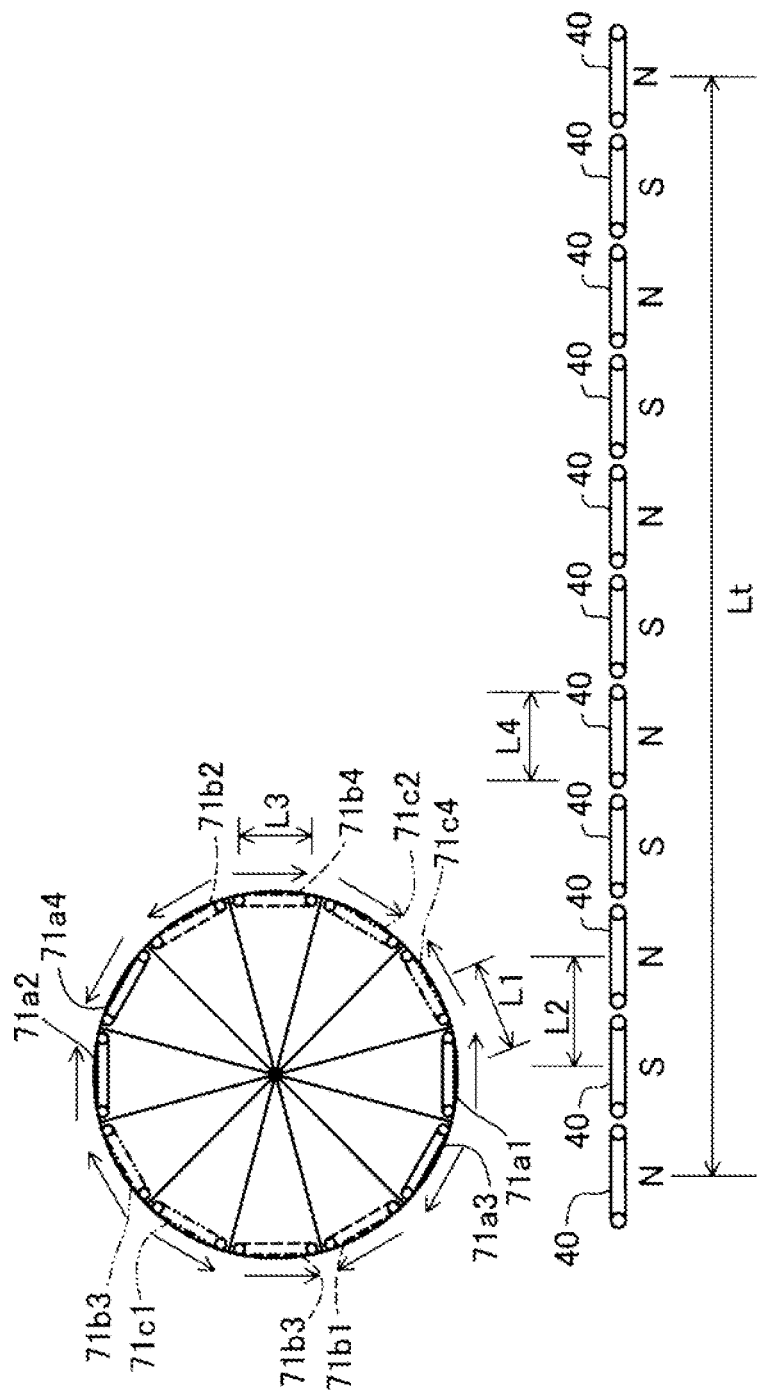
FIG. 7 is an explanatory diagram illustrating a relationship between sizes of the relay coil and the power transmission coil.

An example shown in FIG. 7 includes six relay circuits, that is, twelve relay coils 71a1 to 71a4, 71b1 to 71b4, and 71c1 to 71c4. The twelve relay coils 71a1 to 71a4, 71b1 to 71b4, and 71c1 to 71c4 are arranged along the tread surface of the front wheel tire 60. Coil winding directions of adjacent relay coils 71a1 and 71a3 are opposite. The coil winding directions of adjacent relay coils 71a2 and 71a4 are also opposite. This similarly applies to the other relay coils 71b1 to 71b4 and 71c1 to 71c4. Here, in the example shown in FIG. 7, the relay coil 71a3 and the relay coil 71b1 that are adjacent have a same coil winding direction. However, all adjacent relay coils may have winding directions that are opposite each other.

In the road 105, the plurality of power transmission coils 40 are arranged along the road 105. N-poles and S-poles alternate when a current is sent to the power transmission coils 40. In this case, winding directions of the power transmission coils 40 may alternate and currents that are in a same direction may be sent to the power transmission coils 40. Alternatively, the winding directions of the power transmission coils 40 may be the same and a current that is in a differing direction may be sent to every other power transmission coil 40.

The relay coils 71*a*1 to 71*a*4, 71*b*1 to 71*b*4, and 71*c*1 to 71*c*4 are arranged at a pitch L1 along the outer circumference of the front wheel tire 60. Meanwhile, the power transmission coils 40 are arranged at a pitch L2 along the road 105. In the example shown in FIG. 7, twelve relay coils 71*a*1 to 71*c*4 are present along the outer circumference of the front wheel tire 60 and a circumferential length Lt thereof is 12L1.

Meanwhile, in the road 105, ten power transmission coils 40 are present over the length of the circumferential length Lt, and Lt=10L2. That is, L1≠L2. The pitch L1 of the relay coils 71*a*1 to 71*a*4, 71*b*1 to 71*b*4, and 71*c*1 to 71*c*4 and the pitch L2 of the power transmission coils 40 are unequal. Because the vehicle 202 can freely travel on the road 105, the relay coil 71*a*1 does not necessarily overlap the power transmission coil 40. Here, when the pitch L1 of the relay coils 71*a*1 to 71*a*4, 71*b*1 to 71*b*4, and 71*c*1 to 71*c*4 and the pitch L2 of the power transmission coils 40 differ, power transfer can be performed from any of the power transmission coils 40 to any of the relay coils 71*a*1 to 71*a*4, 71*b*1 to 71*b*4, and 71*c*1 to 71*c*4. Therefore, power transfer as a whole can be leveled and pulsation of the received power can be suppressed.

In the description above, the pitch L1 of the relay coils 71*a*1 to 71*a*4, 71*b*1 to 71*b*4, and 71*c*1 to 71*c*4 and the pitch L2 of the power transmission coils 40 are unequal. However, an arc length L3 along the tread surface of the relay coils 71*a*1 to 71*a*4, 71*b*1 to 71*b*4, and 71*c*1 to 71*c*4 and a length L4 along the road 105 of the power transmission coil 40 may be unequal. In a similar manner, power transfer can be performed from any of the power transmission coils 40 to any of the relay coils 71*a*1 to 71*a*4, 71*b*1 to 71*b*4, and 71*c*1 to 71*c*4. Therefore, power transfer as a whole can be leveled and pulsation of the received power can be suppressed.

Third Embodiment

In the description above, a case in which electric power is transferred to the power reception coil 240*f* from the power transmission coil 40 through the relay circuit 70 in the front wheel tire 60 is described as an example. However, electric power may be transferred to a power reception coil 240*r* from the power transmission coil 40 through a relay circuit 80 in the rear wheel tire 62. Alternatively, electric power may be transferred to both the power reception coil 240*f* and the power reception coil 240*r*.

Figure 8:
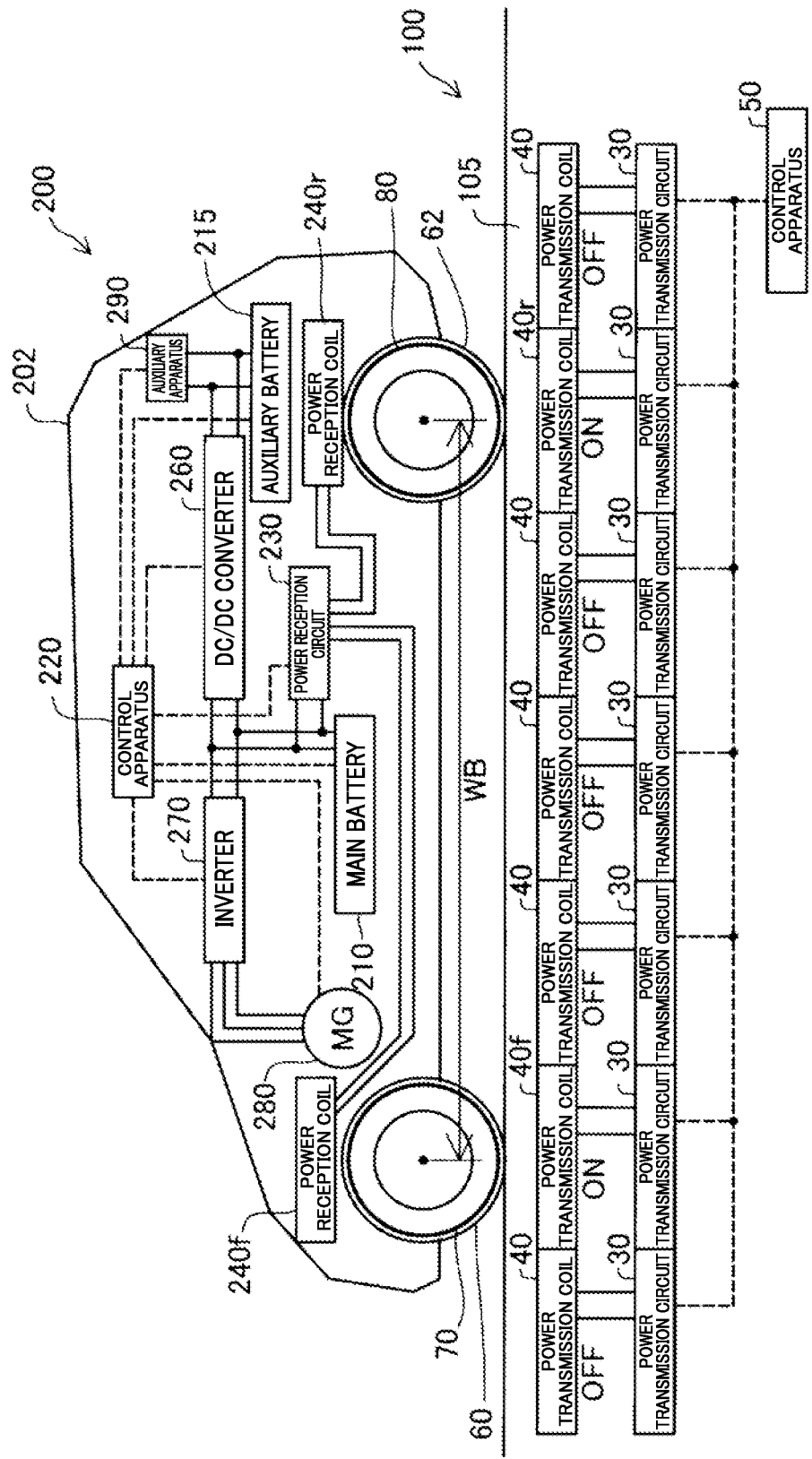
FIG. 8 is an explanatory diagram illustrating an example in which electric power is transferred to two relay coils.
Figure 9:
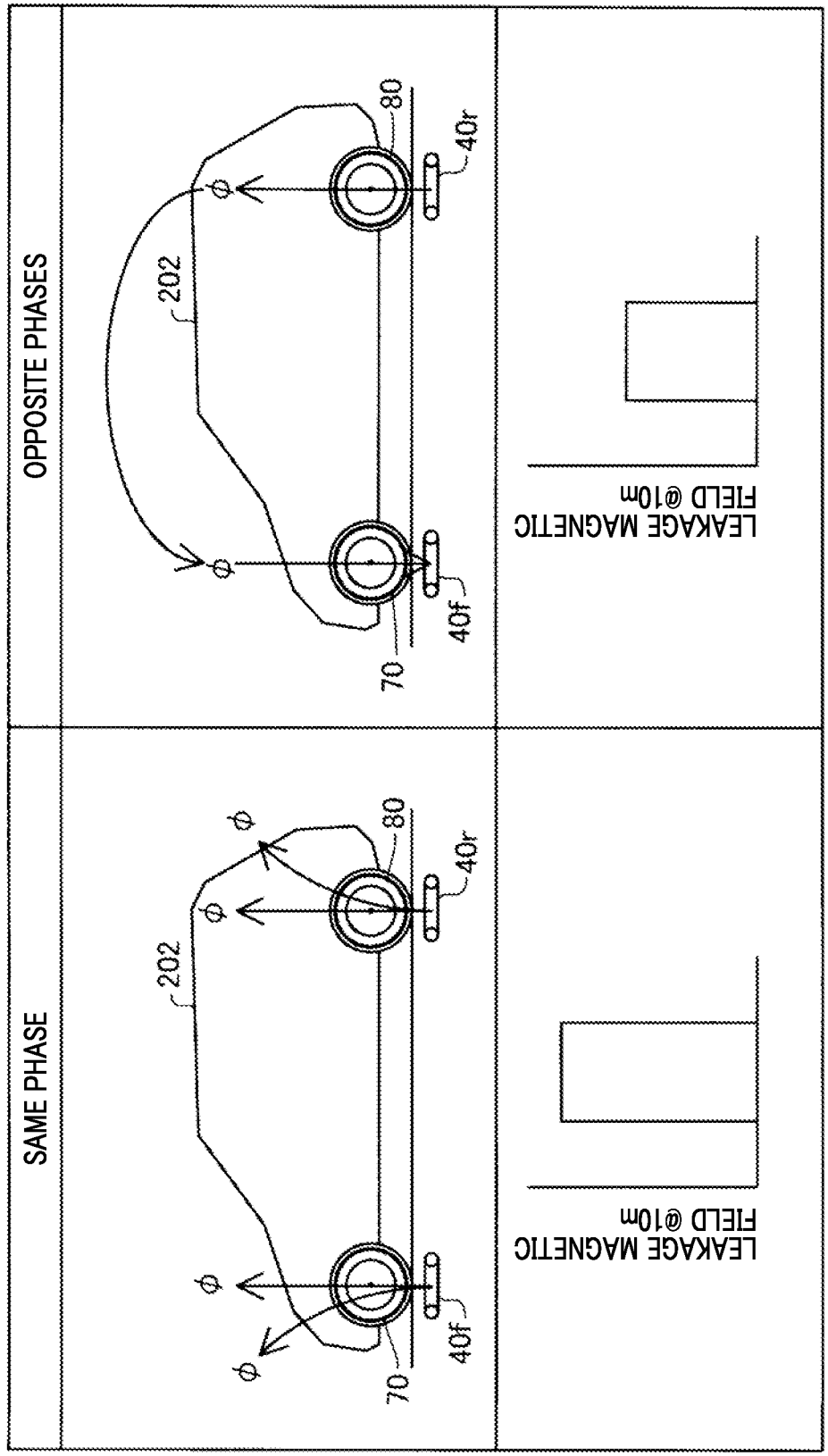
FIG. 9 is an explanatory diagram illustrating magnetic flux that is generated in the power transmission coil and leakage magnetic field.

In a third embodiment example shown in FIG. 8, electric power is transferred to the power reception coil 240*f* from a first power transmission coil 40*f* through the relay circuit 70 in the front wheel tire 60, and electric power is transferred to the power reception coil 240*r* from the second power transmission coil 40*r* through the relay circuit 80 in the rear wheel tire 62. In this case, voltages are applied to the two power transmission coils 40*f* and 40*r* that oppose the relay circuits 70 and 80, and the power transmission coils 40*f* and 40*r* are turned on. However, voltages are not applied to the other power transmission coils 40 that do not oppose the relay circuits 70 and 80, and the other power transmission coils 40 are turned off.

When a first voltage is applied to the first power transmission coil 40*f* and a second voltage is applied to the second power transmission coil 40*r*, there is a case in which the phase of the first voltage and the phase of the second voltage are adjusted such that the magnetic fluxes φ of a same orientation are generated in the two power transmission coils 40*f* and 40*r*, and a case in which the phase of the first voltage and the phase of the second voltage are adjusted such that the magnetic fluxes φ of opposite orientations are generated in the two power transmission coils 40*f* and 40*r* and the magnetic fluxes are canceled out.

According to the present embodiment, the first voltage and the second voltage are applied to the two power transmission coils 40*f* and 40*r* such that the magnetic fluxes φ of opposite orientations are generated in the two power transmission coils 40*f* and 40*r*. As a result, because the magnetic flux on the front wheel tire 60 side and the magnetic flux on the rear wheel tire 62 side are closed, leakage of magnetic flux can be suppressed. Specifically, when all of the power transmission coils 40 are wound in the same direction, the phase of the first voltage and the phase of the second voltage are shifted to be opposite phases.

In addition, when the manner of winding of the power transmission coils 40 is alternately in the opposite directions, when the winding directions of the two power transmission coils 40*f* and 40*r* are the same, the phase of the first voltage and the phase of the second voltage are shifted to be opposite phases. When the winding directions of the two power transmission coils 40*f* and 40*r* are opposite, the phase of the first voltage and the phase of the second voltage are a same phase. When the phases are opposite, the phases are preferably shifted 180°. However, a phase difference may be slightly shifted from 180°, such as by ±10%.

Figure 10:
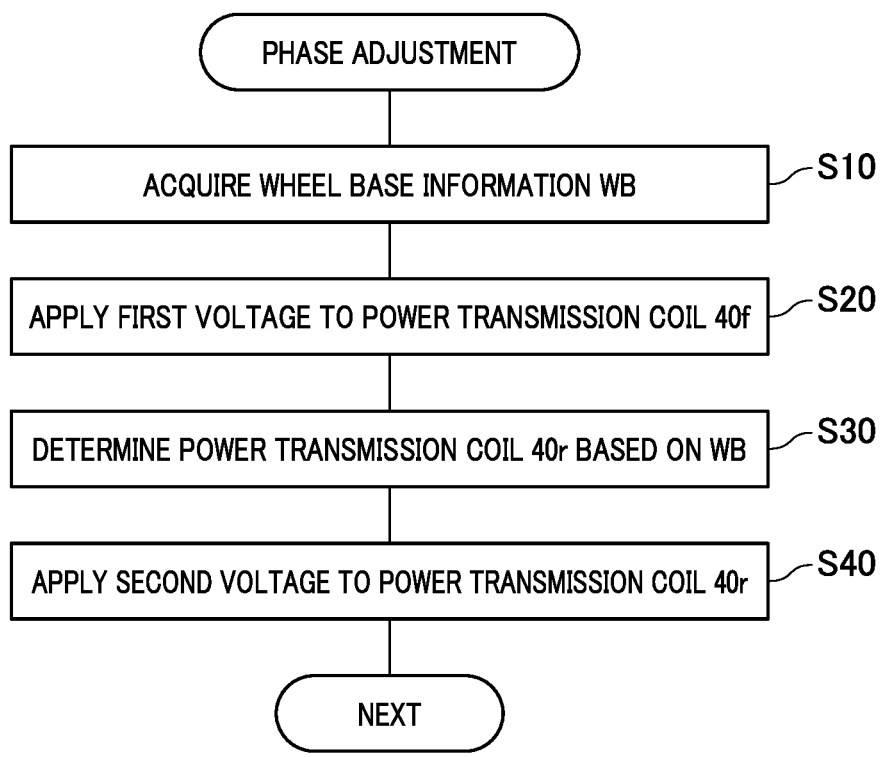
FIG. 10 is a control flowchart in which voltages in opposite phases are applied to front and rear tires.

An example of control to set the phase of the first voltage and the phase of the second voltage to be opposite will be described with reference to FIG. 10. The control apparatus 50 performs a control flowchart in FIG. 10 at every amount of time that is prescribed in advance. At step S10, the control apparatus 50 acquires wheelbase information WB of the vehicle 202. The wheelbase information WB that indicates a length of a wheelbase is determined during designing of the vehicle 202 and is stored in the control apparatus 220.

At step S20, the control apparatus 50 instructs a power transmission circuit 30 to apply the first voltage to the power transmission coil 40*f*. At step S30, the control apparatus 50 determines the power transmission coil 40*r* from the wheelbase information WB. Specifically, the power transmission coil 40*r* is the power transmission coil 40 that is behind the power transmission coil 40*f* by the length of the wheelbase of the vehicle 202.

At step S40, the control apparatus 50 instructs the power transmission circuit 30 to apply the second voltage to the power transmission coil 40*r* such that the orientation of the magnetic flux in the power transmission coil 40*f* and the orientation of the magnetic flux in the power transmission coil 40*r* are opposite. As a result, because the magnetic flux on the front wheel tire 60 side and the magnetic flux on the rear wheel tire 62 side are closed, leakage of magnetic flux can be suppressed.

Figure 11:
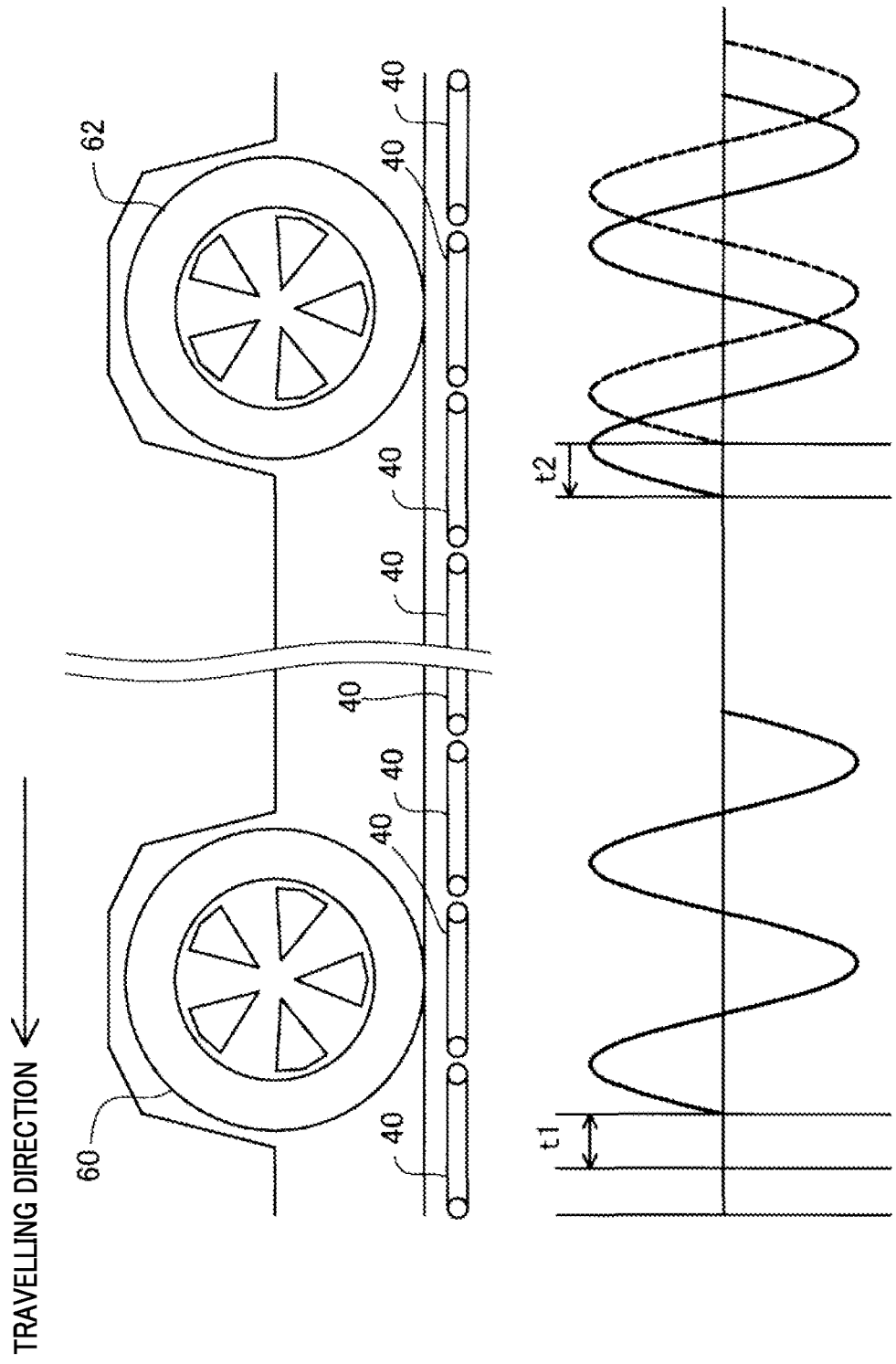
FIG. 11 is an explanatory diagram for explaining timings of voltage application to the relay coil of the front wheel tire and voltage application to the relay coil of a rear wheel tire.

When the vehicle 202 moves in a forward advancing direction, as shown in FIG. 11, when the front wheel tire 60 passes over the first power transmission coil 40*f*, a significant amount of time t1 is present from when the coil position detecting unit 20 detects the relay circuit 70 until electric power is supplied to the first power transmission coil 40*f*. In a similar manner, when the rear wheel tire 62 passes over the second transmission coil 40*r* as well, a similar amount of time is present from when the coil position detecting unit 20 detects the relay circuit 80 until electric power is supplied to the second power transmission coil 40r.

According to the present embodiment, the power transmission circuit 30 acquires vehicle speed information of the vehicle 202 and the wheelbase information WB of the vehicle 202 from the vehicle 202, and adjusts a timing from when the voltage is applied to the first power transmission coil that transfers electric power to the relay circuit 70 in the front wheel tire 60 until the voltage is applied to the second power transmission coil 40r that transfers electric power to the relay circuit 80 in the rear wheel tire 62. In an example shown in FIG. 11, a timing for voltage application to the second power transmission coil 40r is made earlier by t2.

Figure 12:
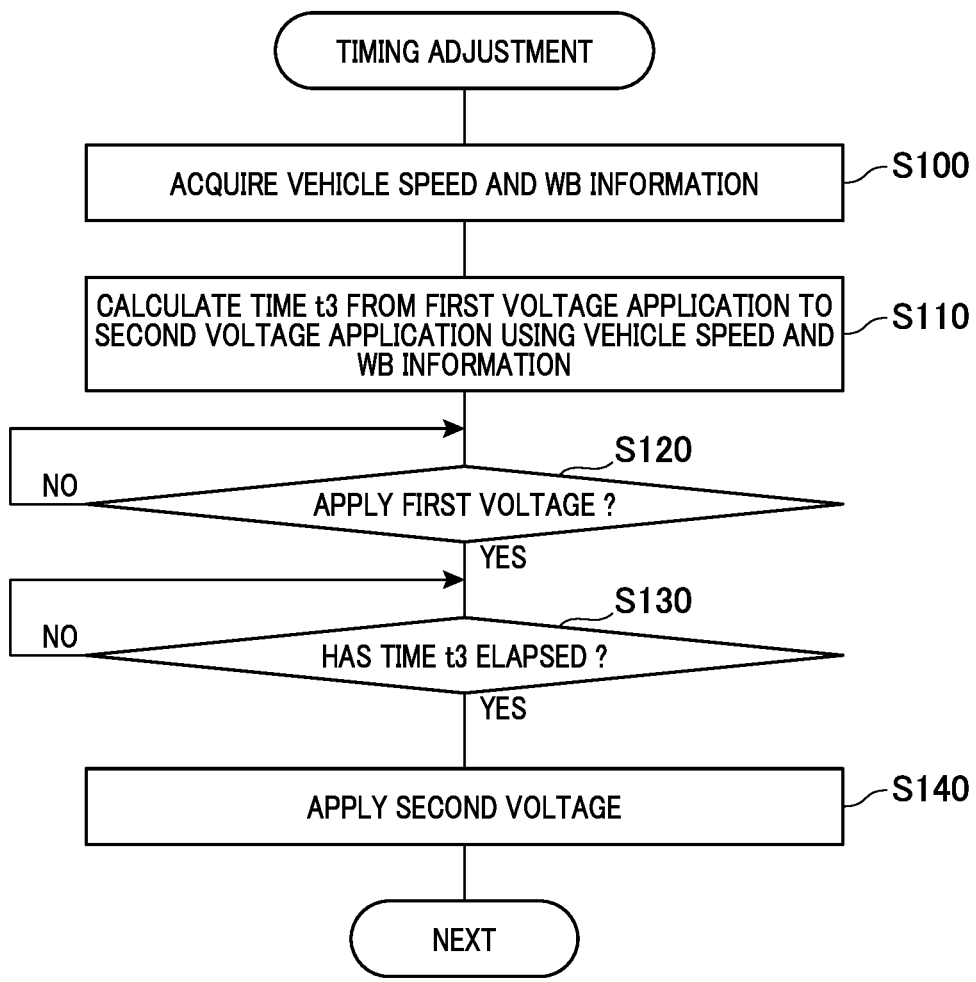
FIG. 12 is a control flowchart of FIG. 11.

An example of control for adjustment of a timing from a first voltage application to a second voltage application performed by the control apparatus 50 will be described with reference to FIG. 12. The control apparatus 50 performs a flowchart shown in FIG. 12 at every fixed amount of time. At step S100, the control apparatus 50 acquires a vehicle speed and the wheelbase information WB of the vehicle 202 from the control apparatus 220 of the vehicle 202. For example, the control apparatus 220 may include a sensor that detects a rotation speed of the front wheel tire 60 and acquires the speed of the vehicle 202 from the rotation speed of the front wheel tire 60.

At step S110, the control apparatus 50 calculates an amount of time t3 from the first voltage application to the second voltage application using the vehicle speed and the wheelbase information WB. At step S120, when the relay circuit 70 in the front wheel tire 60 being present above the power transmission coil 40f is detected, the control apparatus 50 applies the first voltage to the power transmission coil 40f. At step S130, whether the amount of time t3 has elapsed is determined. When the amount of time t3 has elapsed, the control apparatus 50 proceeds to step S140. At step S140, the second voltage is applied to the power transmission coil 40r.

As a result of this control, an amount of time over which electric power can be efficiently supplied to the vehicle 202 from the second power transmission coil 40r can be increased, and more power can be transferred.

Figure 13:
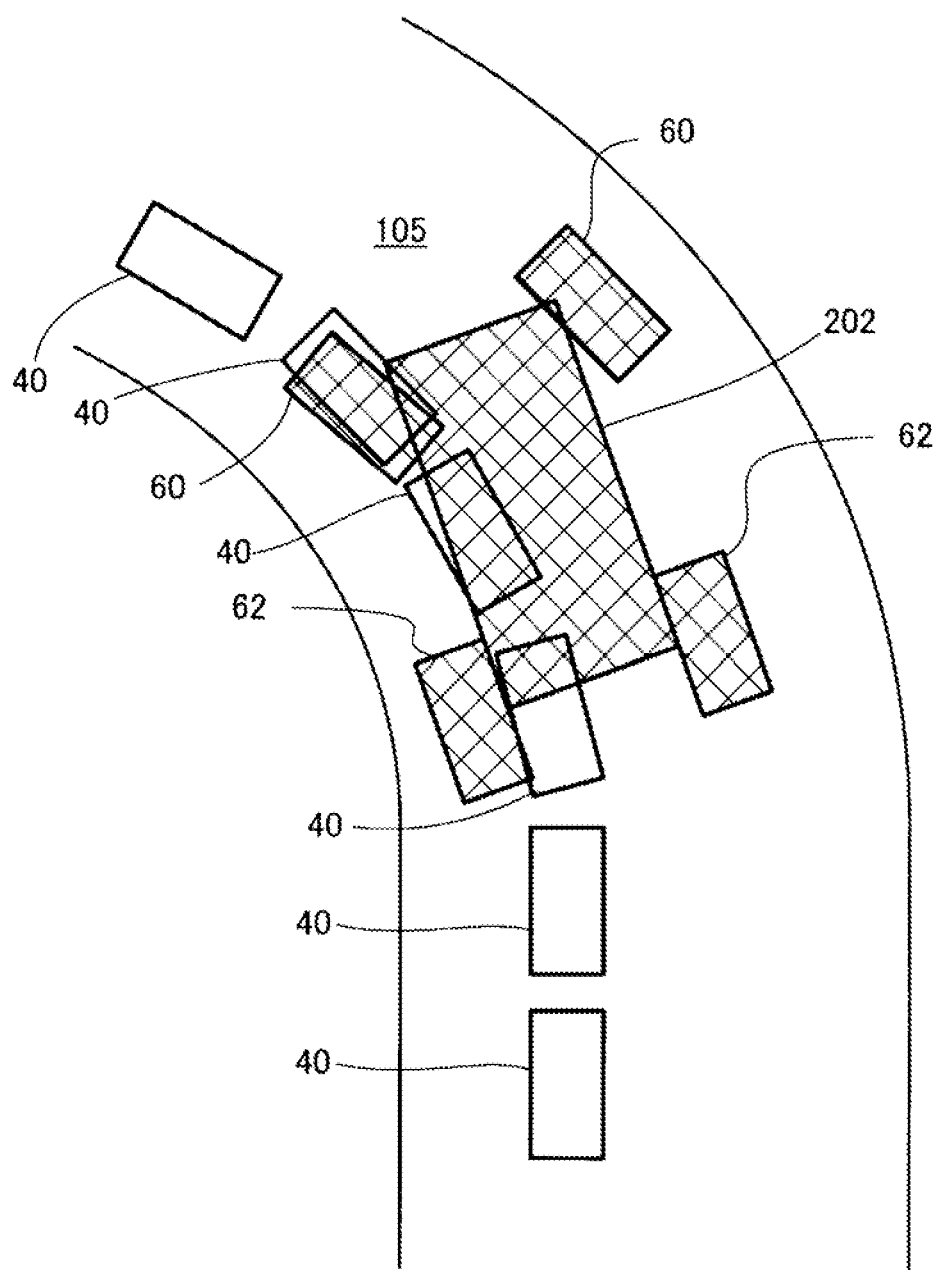
FIG. 13 is an explanatory diagram illustrating a relationship between positions of the tire and the power transmission coil when a vehicle turns on a curve.

FIG. 13 shows a case in which the vehicle 202 turns a curve. When the vehicle 202 turns a curve, due to inner wheel difference, the rear wheel tire 62 passes further towards an inner side than the front wheel tire 60. In this case, the front wheel tire 60 may pass over the power transmission coil 40, but the rear wheel tire 62 may not pass over the power transmission coil 40. In this case, the power transmission circuit 30 may acquire steering angle information and vehicle speed information of the vehicle 202 and control the first voltage that is applied to the first power transmission coil 40f and the second voltage that is applied to the second power transmission coil 40r based on the steering angle information and the vehicle speed information from the vehicle 202.

Figure 14:
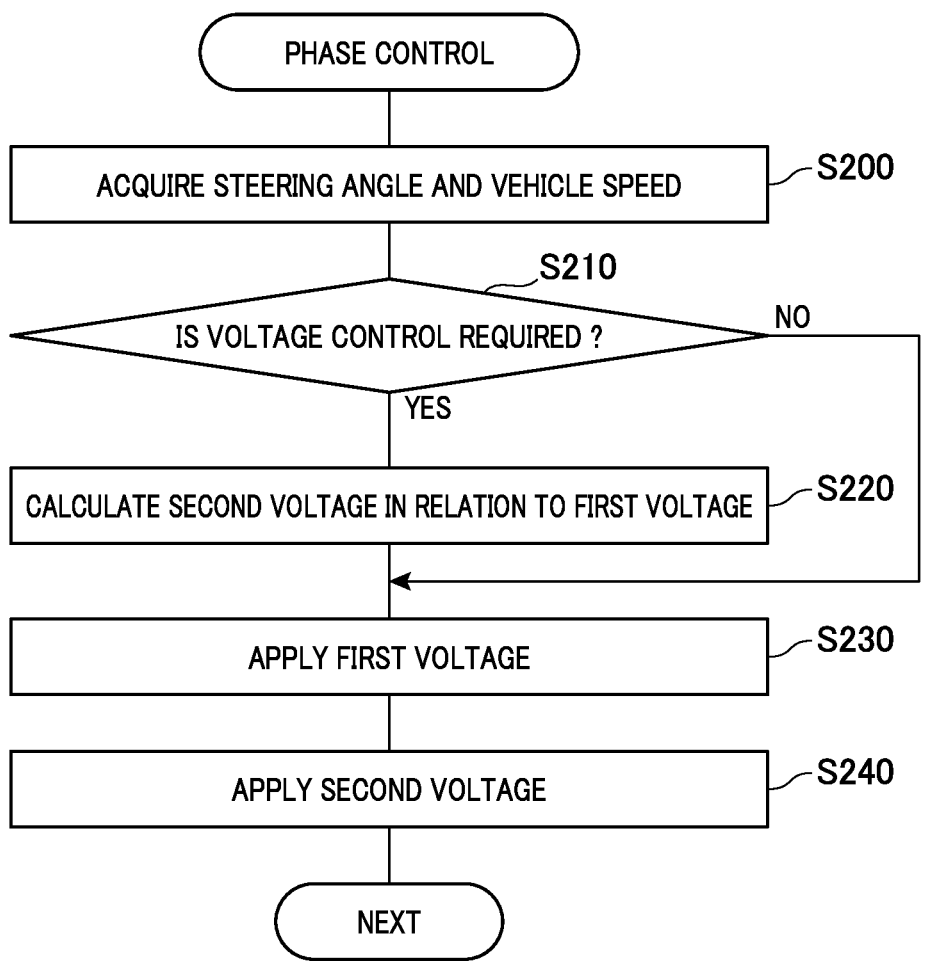
FIG. 14 is a control flowchart of FIG. 13.

An example of control of the first voltage and the second voltage will be described with reference to FIG. 14. The control apparatus 50 performs a flowchart in FIG. 14 at every amount of time that is prescribed in advance. At step S200, the control apparatus 50 acquires a steering angle and the vehicle speed of the vehicle 202 from the control apparatus 220 of the vehicle 202. The control apparatus 220 can acquire the steering angle using a sensor that is provided in a steering wheel of the vehicle 202. The wheelbase information WB is acquired.

At step S210, whether control to change the first voltage and the second voltage from a reference voltage is required is determined. When control is required, the control apparatus 50 proceeds to step S220. At step S220, the control apparatus 50 calculates the second voltage when the first voltage is the reference voltage. At step S230, the control apparatus 50 applies the first voltage to the power transmission coil 40f. At step S240, the control apparatus 50 applies the second voltage to the power transmission coil 40r.

In this manner, as a result of the magnitudes of the first voltage and the second voltage being controlled, the second voltage that is applied to the second power transmission coil 40r over which the relay circuit 80 does not pass can be set to zero or to a small voltage. Therefore, unnecessary supply of electric power can be suppressed. Here, the control apparatus 50 may also control the phases of the first voltage and the second voltage by combining the control shown in FIG. 10 with the control shown in FIG. 14.

Figure 15:
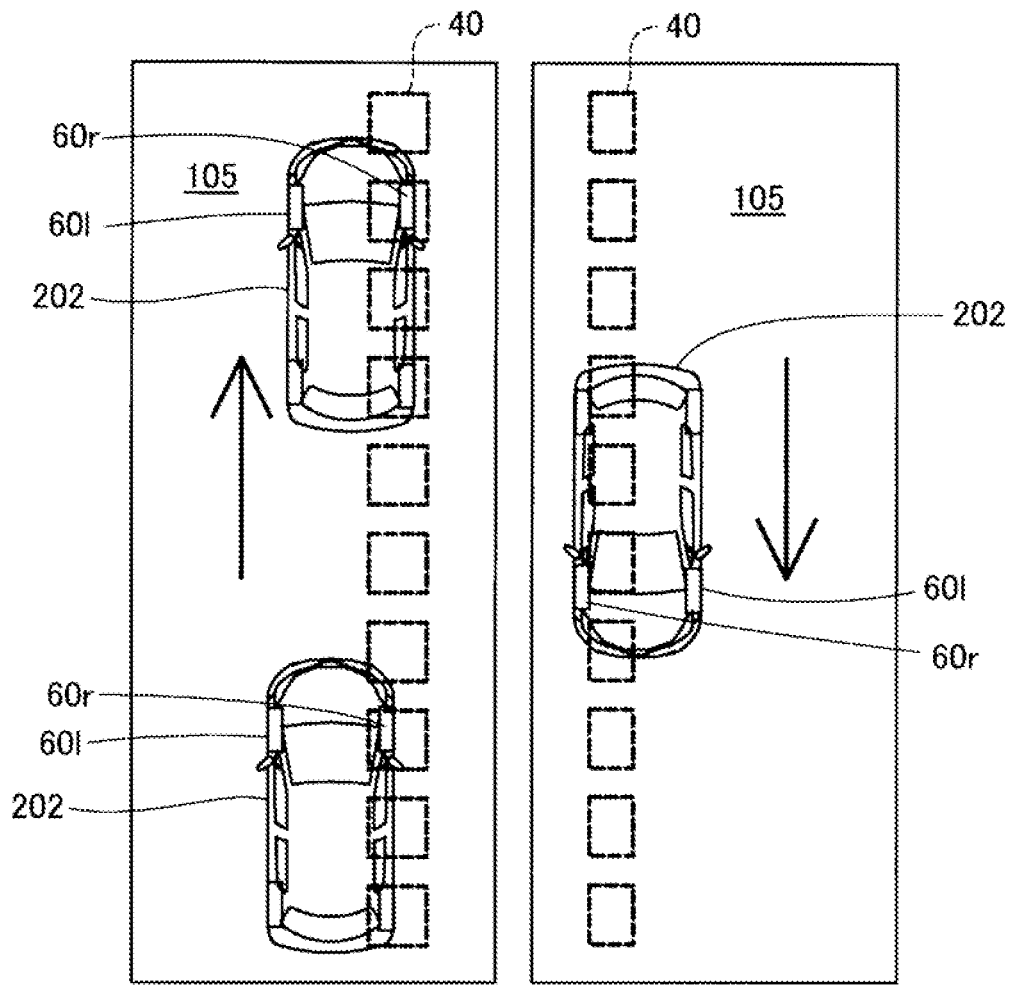
FIG. 15 is an explanatory diagram illustrating a position of the power transmission coil on a road.

An arrangement position of the power transmission coil 40 on the road 105 will be described with reference to FIG. 15. When the road 105 is a road that has two traffic lanes with two-way traffic as shown in FIG. 15, the power transmission coils 40 are arranged in positions that are close to a center of the two traffic lanes in each traffic lane. The vehicle 202 includes the relay circuit 70 in the front wheel tire 60 that is close to the center of the traffic lane. Specifically, in case of left-hand traffic, the relay circuit 70 is provided in a front wheel tire 60r on a right side. In the case of right-hand traffic, the relay circuit 70 is provided in a front wheel tire 60l on a left side. As a result, because the magnetic flux that is generated in the power transmission coil 40 does not easily leak to an edge of the road 105, effects of the magnetic flux in the edge of the road 105 can be suppressed. This similarly applies to when the relay circuit 80 is provided in the rear wheel tire 62.

The control apparatus and the method thereof described in the present disclosure may be actualized by a dedicated computer that is provided so as to be configured by a processor and a memory, the processor being programmed to provide one or a plurality of functions that are realized by a computer program. Alternatively, the control apparatus and the method thereof described in the present disclosure may be actualized by a dedicated computer that is provided by a processor being configured by a single dedicated hardware logic circuit or more.

Still alternatively, the control apparatus and the method thereof described in the present disclosure may be actualized by a single dedicated computer or more, the dedicated computer being configured by a combination of a processor that is programmed to provide one or a plurality of functions, a memory, and a processor that is configured by a single hardware logic circuit or more. In addition, the computer program may be stored in a non-transitory computer-readable storage medium that can be read by a computer as instructions to be performed by the computer.

The present disclosure is not limited to the above-described embodiments and variation examples, and can be actualized through various configurations without departing from the spirit of the disclosure. For example, technical features according to embodiments and variation examples that correspond to technical features in each aspect described in the summary of the invention can be replaced and combined as appropriate to solve some or all of the above-described issued or to achieve some or all of the above-described effects. Furthermore, the technical features may be omitted as appropriate unless described as a requisite in the present specification.

What is claimed is:

1. A dynamic wireless power transfer system comprising:
a power transmission coil that is provided in a road;
a power transmission circuit that supplies electric power to the power transmission coil;
a power reception coil that is provided in a vehicle;
a power reception circuit that is connected to the power reception coil; and
a relay circuit that (i) is provided in a tire of the vehicle, (ii) includes at least two relay coils that are connected in series and arranged at positions that are different from each other in a circumferential direction of the tire, and (iii) transfers electric power from the power transmission coil to the power reception coil by first and second relay coils of the at least two relay coils, the first relay coil opposing the power transmission coil and the second relay coil opposing the power reception coil, wherein
a resonance frequency of the relay circuit is a frequency that is within a fixed range that is centered on an applied frequency of an alternating-current voltage that is applied to the power transmission coil.

2. The dynamic wireless power transfer system according to claim 1, wherein:
the relay circuit includes a resonance capacitor that is connected in series to the at least two relay coils; and
a capacitance of the resonance capacitor is a capacitance at which the resonance frequency of the relay circuit is within the fixed range that is centered on the applied frequency, when inductance of the relay circuit is equal to or greater than a magnitude that is prescribed in advance.

3. The dynamic wireless power transfer system according to claim 2, wherein:
the capacitance of the resonance capacitor is a capacitance at which the resonance frequency of the relay circuit is the applied frequency, when the inductance of the relay circuit is a local maximum.

4. The dynamic wireless power transfer system according to claim 3, wherein:
the relay coils of the relay circuit correspond to a plurality of phases that have differing phases.

5. The dynamic wireless power transfer system according to claim 4, further comprising:
a control apparatus that controls operations of the power transmission circuit, wherein
the vehicle includes
a front wheel tire and a rear wheel tire as the tire,
a first relay circuit that is provided in the front wheel tire and a second relay circuit that is provided in the rear wheel tire as the relay circuit, and
a first power transmission coil that transmits electric power to the first relay circuit that is provided in the front wheel tire and a second power transmission coil that transmits electric power to the second relay circuit that is provided in the rear wheel tire as the power transmission coil, and
the control apparatus adjusts a phase of a first voltage that is applied to the first power transmission coil and a phase of a second voltage that is applied to the second power transmission coil.

6. The dynamic wireless power transfer system according to claim 5, wherein:
the phase of the second voltage is a phase that cancels out a magnetic flux that is generated by the phase of the first voltage.

7. The dynamic wireless power transfer system according to claim 6, wherein:
the control apparatus controls the phase of the first voltage and the phase of the second voltage to be opposite phases.

8. The dynamic wireless power transfer system according to claim 7, wherein:
the control apparatus
acquires wheelbase information of the vehicle from the vehicle, and
adjusts the phase of the first voltage and the phase of the second voltage.

9. The dynamic wireless power transfer system according to claim 8, wherein:
the control apparatus
acquires steering angle information and vehicle speed information of the vehicle, and
controls magnitudes of the first voltage and the second voltage based on the steering angle information and the vehicle speed information.

10. The dynamic wireless power transfer system according to claim 9, wherein:
the control apparatus
controls a timing from when a voltage is applied to the first power transmission coil until a voltage is applied to the second power transmission coil based on the vehicle speed information and the wheelbase information of the vehicle.

11. The dynamic wireless power transfer system according to claim 1, wherein:
the relay coils of the relay circuit correspond to a plurality of phases that have differing phases.

12. The dynamic wireless power transfer system according to claim 1, further comprising:
a control apparatus that controls operations of the power transmission circuit, wherein
the vehicle includes
a front wheel tire and a rear wheel tire as the tire,
a first relay circuit that is provided in the front wheel tire and a second relay circuit that is provided in the rear wheel tire as the relay circuit, and
a first power transmission coil that transmits electric power to the first relay circuit that is provided in the front wheel tire and a second power transmission coil that transmits electric power to the second relay circuit that is provided in the rear wheel tire as the power transmission coil, and
the control apparatus adjusts a phase of a first voltage that is applied to the first power transmission coil and a phase of a second voltage that is applied to the second power transmission coil.

13. The dynamic wireless power transfer system according to claim 5, wherein:
the control apparatus
acquires wheelbase information of the vehicle from the vehicle, and
adjusts the phase of the first voltage and the phase of the second voltage.

14. The dynamic wireless power transfer system according to claim 5, wherein:
the control apparatus
acquires steering angle information and vehicle speed information of the vehicle, and
controls magnitudes of the first voltage and the second voltage based on the steering angle information and the vehicle speed information.

15. The dynamic wireless power transfer system according to claim 5, wherein:
the control apparatus
acquires vehicle speed information and wheelbase information of the vehicle from the vehicle, and
controls a timing from when a voltage is applied to the first power transmission coil until a voltage is applied to the second power transmission coil based on the vehicle speed information and the wheelbase information of the vehicle.

16. The dynamic wireless power transfer system according to claim 1, wherein:
the first and second relay coils are located at diametrically opposite portions of a circumference of the tire.

17. The dynamic wireless power transfer system according to claim 16, wherein:
the first and second relay coils do not overlap each other in the circumferential direction of the tire.

18. The dynamic wireless power transfer system according to claim 1, wherein:
the first and second relay coils do not overlap each other in the circumferential direction of the tire.

19. The dynamic wireless power transfer system according to claim 1, wherein:
the at least two relay coils includes at least two pairs of the relay coils, the relay coils of each of the pairs arranged at positions that are different from each other in the circumferential direction of the tire.

20. The dynamic wireless power transfer system according to claim 19, wherein:
the relay coils of each of the pairs are located at diametrically opposite portions of a circumference of the tire and do not overlap each other in the circumferential direction of the tire.

* * * * *